US006887387B2

United States Patent
Hobson

(10) Patent No.: US 6,887,387 B2
(45) Date of Patent: May 3, 2005

(54) OIL AND CHIP SKIMMER

(75) Inventor: Mark T. Hobson, Chargin Falls, OH (US)

(73) Assignee: Abanaki Corporation, Auburn, OH (US)

( * ) Notice: Subject to any disclaimer, the term of this patent is extended or adjusted under 35 U.S.C. 154(b) by 57 days.

(21) Appl. No.: 10/647,886

(22) Filed: Aug. 25, 2003

(65) Prior Publication Data
US 2005/0045542 A1 Mar. 3, 2005

(51) Int. Cl.[7] .................................................. C02F 1/40
(52) U.S. Cl. ....................... 210/695; 210/776; 210/222; 210/526; 210/540; 210/923; 210/532.1
(58) Field of Search ................................. 210/695, 776, 210/242.1, 242.3, 222, 526, 540, 923, 924, 259, 532.1, 299

(56) References Cited

U.S. PATENT DOCUMENTS

| | | | | |
|---|---|---|---|---|
| 2,670,847 A | * | 3/1954 | Egloff et al. ................. 210/526 |
| 2,783,890 A | * | 3/1957 | Harlan ......................... 210/526 |
| 3,508,663 A | * | 4/1970 | Brill ............................ 210/924 |
| 3,695,451 A | * | 10/1972 | Schmidt et al. .............. 210/526 |
| 3,709,369 A | * | 1/1973 | Brill et al. ................... 210/924 |
| 4,518,496 A | * | 5/1985 | Kanekubo ................... 210/222 |
| 4,544,060 A | * | 10/1985 | Enomoto ..................... 210/222 |
| 4,652,372 A | * | 3/1987 | Threadgill ................. 210/242.3 |
| 4,876,011 A | * | 10/1989 | Betts et al. .................. 210/526 |
| 5,062,953 A | * | 11/1991 | Lewan ........................ 210/526 |
| 5,378,371 A | | 1/1995 | Hobson |
| 5,645,733 A | | 7/1997 | Hobson |
| 5,989,422 A | * | 11/1999 | Hobson ....................... 210/400 |
| 2001/0052498 A1 | * | 12/2001 | Bratten ....................... 210/695 |
| 2004/0164014 A1 | * | 8/2004 | Rhein et al. ................. 210/540 |

OTHER PUBLICATIONS

Commercial Literature from Abanaki Corporation TubeTastic!™ Oil Skimmer.

* cited by examiner

Primary Examiner—Christopher Upton
(74) Attorney, Agent, or Firm—Watts Hoffman Co., LPA

(57) ABSTRACT

A skimmer for removing oil and paramagnetic chips from a contaminated body of machine tool coolant. The skimmer includes a frame and an endless tube partially trained within the frame that defines a travel path. The path of the tube includes a first section within the body of coolant and a second section out of the body of coolant. The skimmer further includes a magnet disposed within the tube, a drive system mounted to the frame and operatively coupled to the tube to power travel of the tube, and a wiper connected to the frame at a position along the travel path. The wiper is advantageously positioned adjacent to the tube such that the wiper removes oil and metal chips carried by the tube. A receptacle is includes that delineates a collection space positioned below the wiper to receive oil and metal chips.

27 Claims, 4 Drawing Sheets

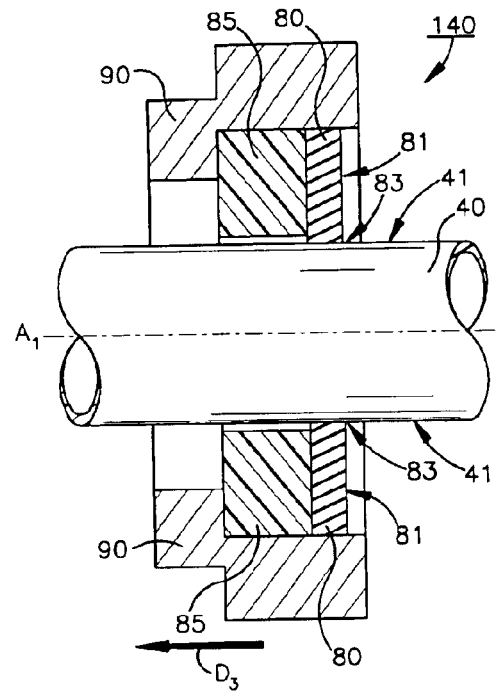
Figure 6
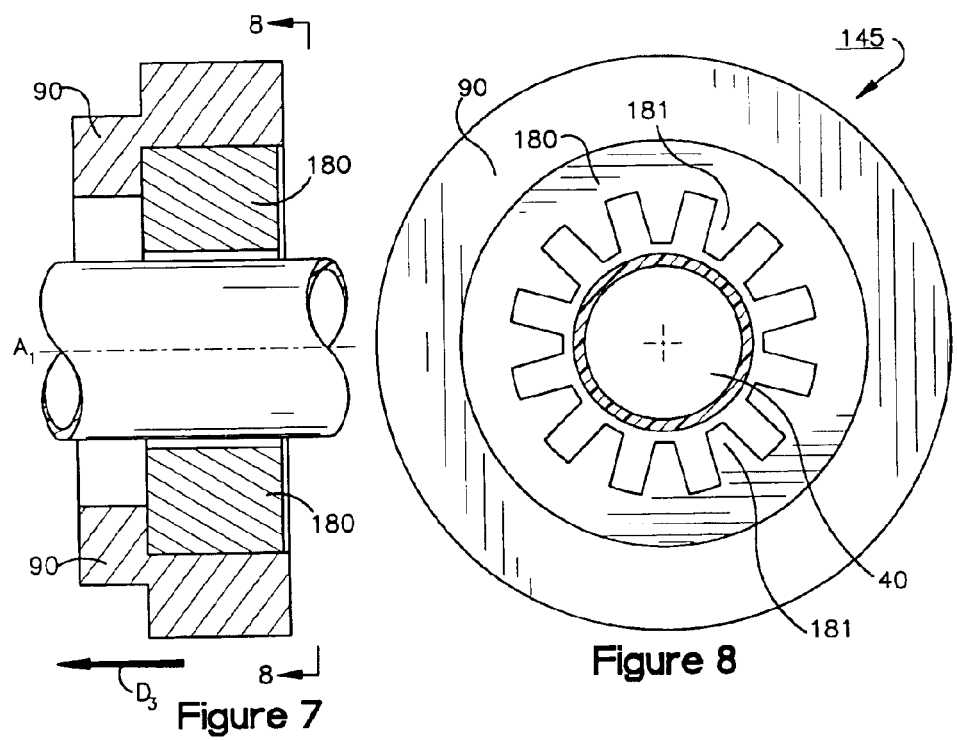
Figure 7
Figure 8

US 6,887,387 B2

OIL AND CHIP SKIMMER

FIELD OF THE INVENTION

The present invention is directed to a method and apparatus for separating contaminates from a liquid bath and more particularly is directed to a method and apparatus which are especially suited for removing metal chips and hydrocarbons from a collection tank of machine tool coolant.

BACKGROUND

Oil skimmers for removing oil and other hydrocarbons from surfaces of bodies of water and other liquids are known in the art. One application for these skimmers is in production and tooling centers in which machining operations are performed that use machine tool coolant. During these types of operations, a material amount of oil, metal chips and coolant is directed to a collection tank.

Various oil skimmer styles have been employed to remove oil from water surfaces. Styles of conventional skimmers include belt type oil skimmers, such as those described in U.S. Pat. No. 5,378,371 to Hobson, issued Jan. 3, 1995, and in U.S. Pat. No. 5,645,733 to Hobson, issued Jul. 8, 1997. The '371 patent and the '733 patent are hereby incorporated by reference in their respective entireties. While oil skimmers of belt and other types have been relatively successful in removing oil from water surfaces, they do not address the issue of metal chips that accumulate within a coolant collection tank as a consequence of machining operations.

Metal chips that accumulate on the floor of a collection tank are not affected by the operation of conventional oil skimmers. To prevent a prohibitive quantity of chip build-up on the floor of the tank, an operator must periodically remove the accumulated chips. The chips must be manually removed by a shovel or other suitable tool. Consequently, this type of manual removal requires undesired labor hours and may increase machine down time within these machining centers.

Accordingly, a need exists in the art for a novel and improved oil and chip skimmer for automatic removal of paramagnetic metal chips and hydrocarbons from a collection tank.

SUMMARY OF THE DISCLOSURE

The present invention provides a method and apparatus suited for removing oil and metal chips from a body of liquid. Skimmers embodying the present invention are beneficial to operators of conventional machining centers that direct coolant, metal chips and oil to a collection tank. The method and apparatus of the present invention advantageously removes ferromagnetic chips without manual operations.

In a preferred embodiment, a skimmer includes a frame structure, an endless tube, a plurality of magnets disposed within the tube in a spaced relationship, a drive system, a wiper and a receptacle for collecting oil and metal chips. The frame structure is positioned above a surface of a tank of contaminated coolant. The endless tube is partially trained within the frame structure to define a travel path. In motion, the travel path of the tube has a first section within the tank and a second section out of the tank. The drive system is mounted to the frame structure and operatively coupled to the tube. The drive system powers the tube into and out of the tank along the travel path.

The wiper is secured to the frame structure at a position along the travel path. Further, the wiper is advantageously positioned adjacent to the tube such that the wiper removes hydrocarbon and metal chip contaminants adhered to an exterior surface of the tube.

The skimmer further includes a plurality of spacers disposed within the tube. Each spacer is disposed between two magnets to maintain the magnets in a spaced relationship. The spacers are constructed of a material selected from the group consisting of wood, plastic and metal.

A U-shaped bracket mounted to the frame is also included. A shaft seal connected on the bracket and disposed between the wiper and the bracket maintains the wiper in an essentially fixed position along a longitudinal center axis of the tube. In the preferred embodiment, the wiper is a rubber annular wiper.

In an alternative embodiment, the skimmer includes a second wiper mounted to the frame and positioned upstream from the first wiper. The second wiper includes a ring having a center axis and a plurality of spokes extending radially from the ring toward the center axis. With the tube in motion, the spokes act to rack large chunks of accumulated metal chips off the tube prior to the tube contacting the first wiper. To enhance the performance of the skimmer as desired, the first wiper may be constructed as a scraper or a brush.

The skimmer includes a series of guides successively mounted to the frame structure to define a travel path of the tube within the frame structure. A housing is included and fixedly mounted to the frame. The drive system is contained within the housing as well as a series of guides defining a travel path of the tube.

Chips and oil that are removed by the wiper fall by gravity into the receptacle. The receptacle defines a hole for draining hydrocarbon material collected within the receptacle. The receptacle includes a perforated plate that is mounted above a bottom surface of the interior of the receptacle.

A method practiced in accordance with the present invention is directed to a process to remove hydrocarbon and metal chip contaminants from a body of water. The method includes the first steps of positioning a plurality of magnets with an endless tube in spaced apart relationship and locating the endless tube within a drive system mounted on a frame structure and thereby positioning a portion of the tube in a body of coolant.

A subsequent method step includes operating the drive system to cause the endless tube to travel on a descending path into the body of water, thereby causing hydrocarbons and chips to adhere to an outer surface of the tube. As a result, chips are magnetically joined on the outer surface of the tube to the plurality of magnets.

A subsequent method step includes continuing to operate the drive system to bring the tube on an ascending path to a wiper. The wiper is connected to the frame structure and advantageously positioned adjacent to the tube.

Concluding method steps include wiping hydrocarbons and chips adhering to the outer surface of the tube by use of the wiper and collecting the wiped hydrocarbons and chips that fall by gravity into a receptacle positioned below the wiper.

The wiping process step is performed on a generally horizontal section of the tube. In addition, the process includes the step of positioning the wiper around the outer surface of the tube at a location on the tube prior to the descending path of the tube. Further, the process includes the step of separating by gravity the hydrocarbons and chips that collect in the receptacle.

Further advantages and a fuller understanding of the invention will be had from the accompanying drawings and the detailed description of the invention.

BRIEF DESCRIPTION OF THE DRAWINGS

FIG. 6 is a cross-sectional view of a wiper assembly that forms part of the skimmer of FIG. 2, showing a wiper, bearing seal and U-shaped bracket and illustrated along the longitudinal axis of the tube;

FIG. 7 is a cross-sectional view of a second wiper assembly, showing a wiper and U-shaped bracket and illustrated along the longitudinal axis of the tube; and FIG. 8 is a front view of the second wiper assembly of FIG. 7 as seen approximately from a plane taken along the lines 8—8 of FIG. 7.

DETAILED DESCRIPTION OF THE PREFERRED EMBODIMENT

Figure 1:
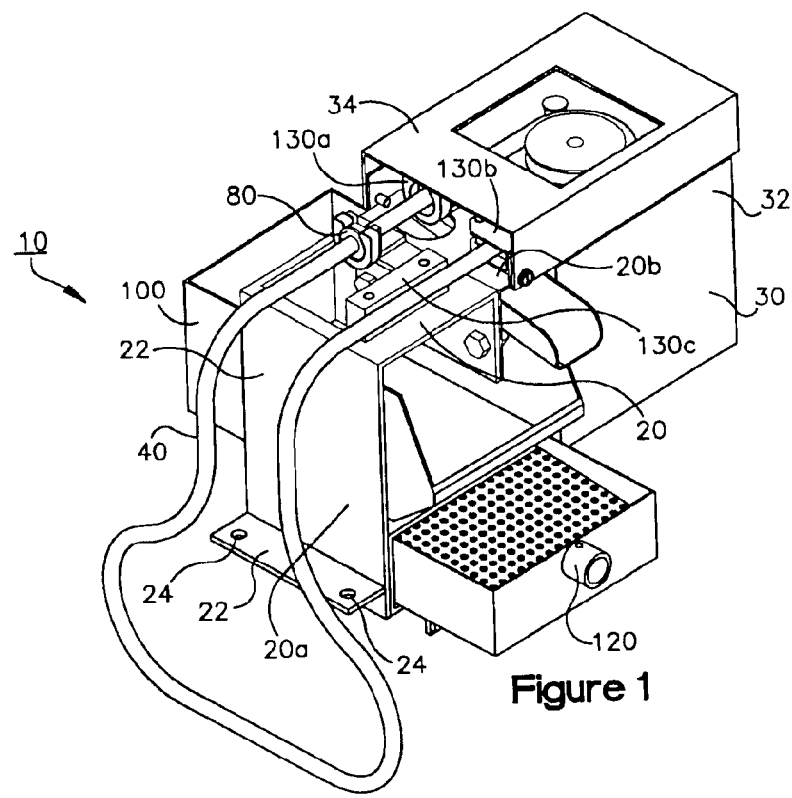
FIG. 1 is a perspective view of an oil and chip skimmer constructed in accordance with the preferred embodiment of the present invention.

Referring now to the drawings, an oil and chip skimmer 10 constructed in accordance with the preferred embodiment of the present invention is illustrated. The skimmer as shown is well-suited for removing paramagnetic chips and oil contaminants that accumulate in a collection tank during machining and tooling operations. The skimmer advantageously removes these contaminants from the tank without manual operations as required in the prior art.

Figure 2:
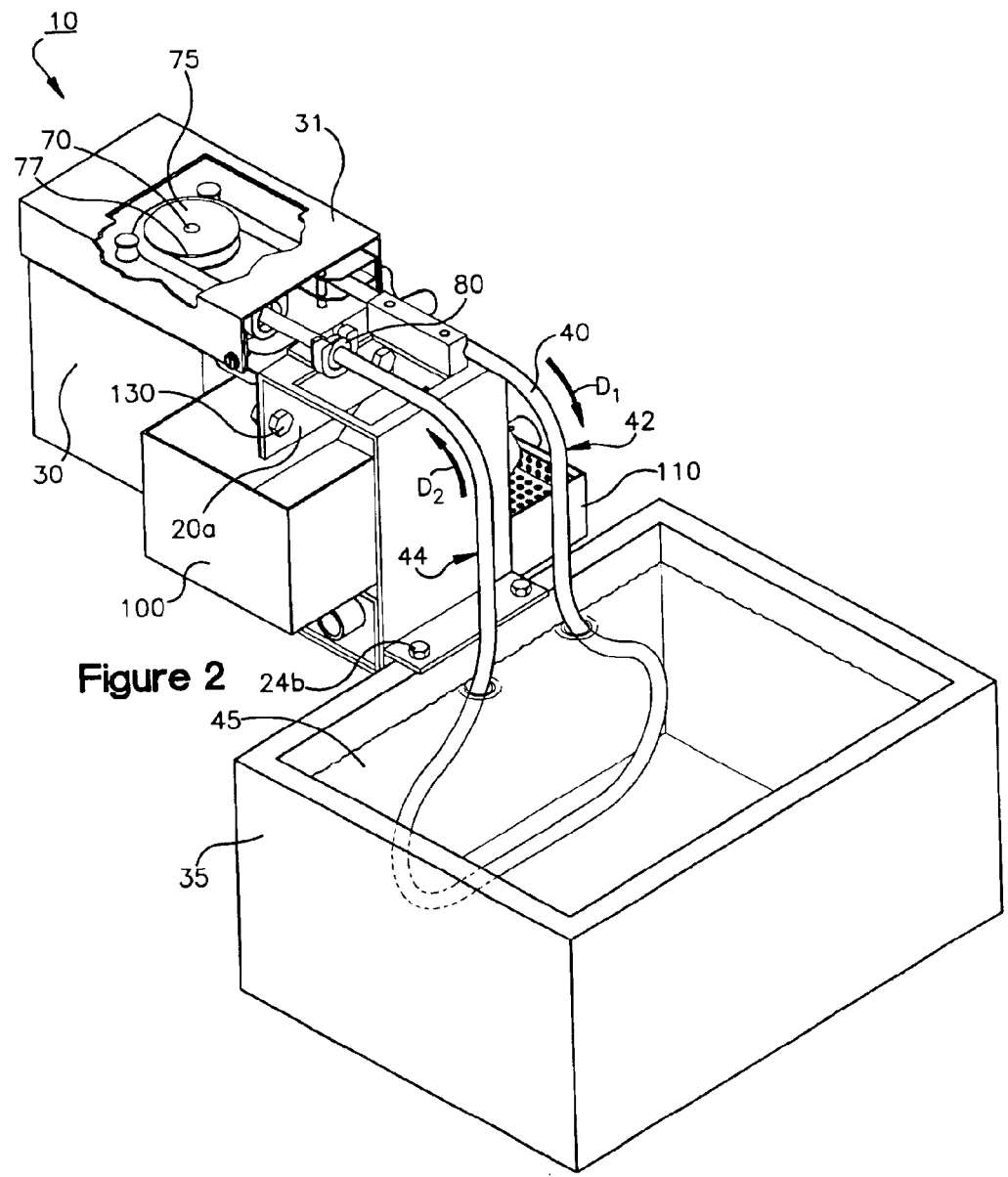
FIG. 2 is an alternative perspective view of the skimmer of FIG. 1 shown installed on a collection tank.
Figure 5:
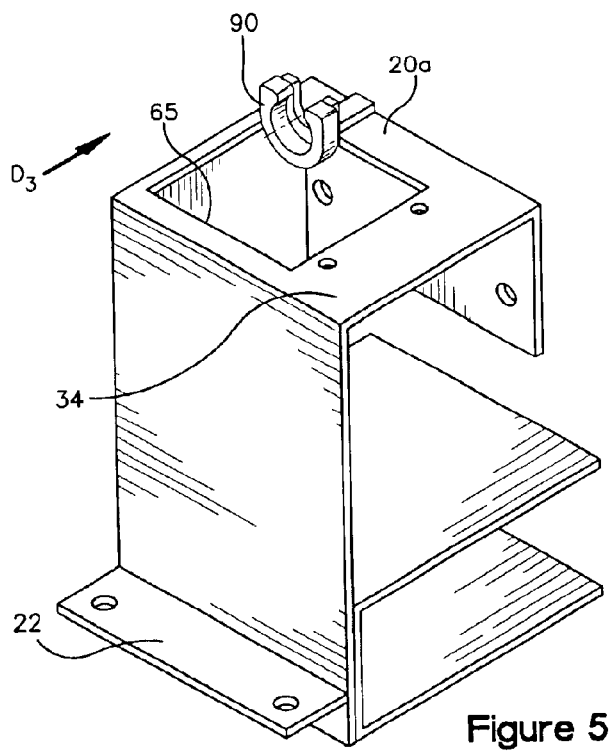
FIG. 5 is a perspective view of a frame member that forms part of the skimmer of FIG. 2, showing a U-shaped bracket.

As illustrated in FIG. 1, the skimmer includes a frame structure 20. The frame 20 is formed from sheet metal and is utilized to position the skimmer above a body of water, as shown in FIG. 2. In the embodiment illustrated, the frame 20 is formed by an identical first frame member 20a and second frame member 20b fastened together in a mirrored relationship. As best seen in FIG. 2, conventional hardware 130 is used to mount the first and second members 20a, 20b together. The first frame member 20a is illustrated prior to assembly in FIG. 5. Although not required in the practice of the present invention, mounting the first and second members together in this mirrored relationship provides certain benefits to be discussed.

One section of the frame includes a horizontal plate 22 that defines two mounting holes 24. A rectangular shaped housing 30 is shown secured to a portion of the second frame member 20b. The housing provides some protection to certain parts of the skimmer, such as the drive system, from the relatively harsh application environment in which the skimmer is likely to be employed. It should be understood by others with ordinary skill in the art that the specific frame and housing shown in the drawings is for exemplary purposes only, and that other designs can be utilized in the practice of the present invention.

FIG. 2 shows a perspective view of the skimmer 10 securely installed onto a collection tank 35. Mounting bolts 24b are used to secure the skimmer to the vessel. An exemplary tank contains a bath 45 of machine tool coolant that is contaminated with metal chips, oil, and other hydrocarbons.

The skimmer 10 includes an endless tube 40 that is trained in and out of the frame structure 20. In the preferred embodiment, the tube is conventional plastic tubing with a relatively thin outer wall. The tube 40 winds in and out of the frame 20 and the bath 45 to generally define a travel path. While in motion, portions of the travel path are defined by a descending tube section 42 traveling in a direction $D_1$ and an ascending tube section 44 traveling in a direction $D_2$. The tube path is further defined by guides 130a, 130b, 130c successively mounted on the frame structure 20, as shown in FIG. 1. These guides act to passively regulate movement of the tube within the frame structure. The first guide in the series 130a is a U-bracket welded to the second frame member 22b. The third guide 130c is a rectangular shaped block that prevents movement of the tube toward an aperture 65 defined by the top surface 34 of the first frame member 20a. (see FIG. 5). As a result, the descending tube section is kept away from an area of accumulation 84 of removed metal chips (see FIG. 3). This prevents the tube from gathering any oil or chips on its exterior surface 41 prior to the descending path into the bath along the direction $D_1$. Consequently, the skimmer of the present invention advantageously does not contaminant the bath at the same time it is trying to clean it. To enhance the performance of the skimmer as desired, further guides (not shown) may be included as part of the frame 20 and/or within the housing 30.

As a result of the guides discussed, the travel path of the tube repeats in a generally circular fashion. However, it should be understood by others with ordinary skill in the art that the tube itself will take minor variations along this generally path, especially while within the bath 45 where it is generally unsupported. As shown in FIG. 2, the tube will travel on or near the floor of the tank to attract paramagnetic chips on the floor of the tank. This unsupported tube movement within the bath acts to stir the bath and as a result, metal chips gathered on the bottom surface of the vessel 35 may be disturbed. Consequently, the cleaning efficiency of the skimmer is believed to be increased. As the tube leaves the surface of the bath, oil is skimmed from the surface as well as a relatively small amount of coolant.

Figure 4:
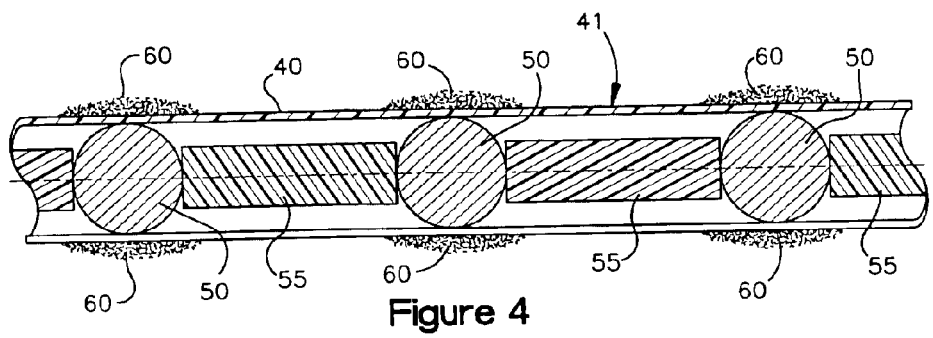
FIG. 4 is a cross-sectional view of a tube assembly that forms part of the skimmer of FIG. 2, showing clumps of metal chips carried by a tube containing magnets.

Referring now to FIG. 4, a cross-sectional view of a tube assembly is shown. As shown, the preferred embodiment includes a series of spherical-shaped magnets 50 provided within the tube in a spaced relationship. The magnets may be of any functionally length, size or strength in the practice of the present invention. As shown, the diameter of the magnet 50 is almost as large as the interior diameter of the tube 40. A magnet of this size advantageously attracts and collects metal chips 60 to an exterior surface 41 of the tube as the tube passes through a contaminated bath.

To maintain the magnets in a spaced relationship, a series of spacers 55 is disposed between each magnet 40. In the relationship illustrated, the magnets move very little in an axial direction relative to the tube because the magnets and spacers essentially fill the tube. In other words, the axially combined length of the series of magnets and spacers is essentially equal to the axial length of tube. The illustrated spacers are constructed of plastic, but in the practice of the invention can be constructed from any suitable material, including wood, plastic or non-metallic metal. As desired to improve the magnetic qualities of the tube assembly, the spacers may be constructed of a magnetic material.

The travel of the tube 40 through the apparatus 10 is powered by a drive system mounted to the frame structure. Referring again to FIG. 2, the drive system is shown exposed by a rectangular-shaped aperture 66 in a top surface 31 of the housing 30. A pulley 75 is rotatably connected to an output shaft 70 of a motor (not shown). The tube 40 is operatively coupled to the pulley for powering the tube into and out of the water bath. Specifically, the tube is trained around an outer circumference 77 of the pulley 75. The pulley may include inner and outer side flanges to securely contain the tube. It should be understood by those with ordinary skill in the art that other conventional drive systems may be used in the practice of the present invention.

One of the outstanding features of the present invention is provided by a wiper mounted 80 to the frame structure. In the preferred embodiment, an annular wiper is positioned adjacent to the tube 40 along a horizontal section of the tube's travel path. As such, the wiper will remove hydrocarbon and metal chip contaminants adhered to an exterior surface of the tube as the tube passes through the interior of the annular wiper.

Shown in more detail, FIG. 6 provides a cross-sectional view of a wiper assembly 140 along the longitudinal axis $A_1$ of the tube. In the preferred embodiment illustrated, the wiper assembly 140 includes an annular wiper 80 constructed of rubber, a bearing seal 85 secured downstream from the wiper 80, and a U-shaped bracket 90 permanently fixed to the frame 20 (not shown). The location of a U-shaped bracket 90 in relation to the first frame member 20a is clearly illustrated in FIG. 5. As shown, the bracket 90 has been welded to the top surface 34 of a first frame member 20a and extends over the aperture 65 to allow falling chips to not contact the frame member 20a. It should be understood by those with ordinary skill in the art that any other suitable techniques may be used to securely fasten the bracket to the frame structure in the practice of the invention.

Referring again to FIG. 6, as the tube is powered in a direction $D_3$ downstream away from the bath, metal chips adhering to the exterior surface 41 of the tube contact the exposed face 81 of the wiper 80. Chips that have accumulated a distance from the surface, i.e., on top of other chips, will intersect the tube side wall 81 and fall by gravity off the tube. At or near a contact point 83, other metal chips on the surface 41 will accumulate as they are scrapped from the surface of the tube. Any axial force on the wiper that may be generated from contact with the tube, or from the collision of the metal chips with the wiper, is dampened by the seal 85. As shown, the seal is positioned between the wiper and the bracket. The seal advantageously maintains the wiper in an essentially fixed position along the longitudinal axis $A_1$ of the tube.

An alternative embodiment of a wiper assembly 145 is illustrated in FIG. 7. The wiper 180 includes a ring and a series of spokes 181 extending radially from the ring toward the center axis $A_1$ of the wiper. To enhance the performance of the skimmer as desired, the spokes 181 may take the form of nylon bristles to form an annular brush. Further, a conventional flat washer may be used without spokes 181.

A front view of the wiper 180 connected to the bracket 90 is shown in FIG. 8. In use, the alternative wiper 180 is mounted upstream from the first wiper 80 to remove larger accumulated portions of metal chips on the tube prior to the tube passing through the first wiper. In other words, the wiper 180 acts to rack large chunks of chips off of the tube 40. The second wiper 180 is secured within the U-bracket on the first frame member 20a and the first wiper is secured within the U-bracket on the second frame member 20b. In other words, the first wiper may be mounted at guide 130a and the second wiper 80 mounted upstream. as illustrated in FIG. 1. Use of the second wiper 180 prevents chips from jamming between the wiper 80 and the tube. During operation of the skimmer, it is believed that chip jamming may cause the drive system to fail.

Figure 3:
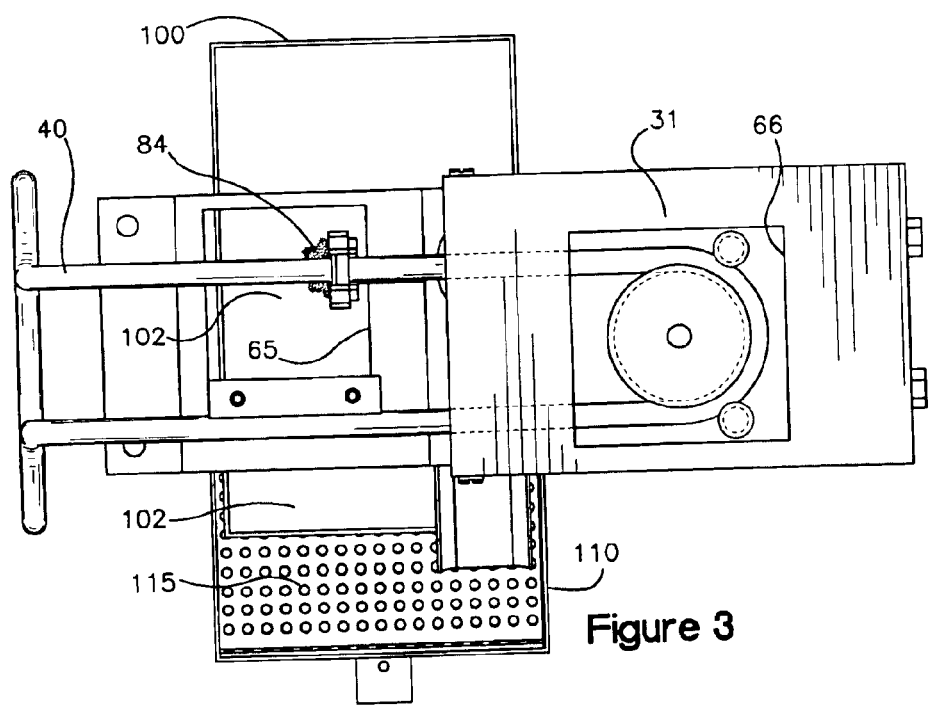
FIG. 3 is a top view of the skimmer of FIG. 2 shown with an accumulated amount of metal chips disposed adjacent to a wiper.

A receptacle is used to collect oil and metal chips removed by the wiper. Any suitably sized receptacle may be used. In one embodiment shown in the drawings, a plastic tub 100 is positioned below the wiper to collect a mass of metal chips that fall by gravity from the intersection of the wiper and tube. As best shown in FIG. 3, the chips 84 fall through the aperture 65 to an exposed surface 102 of the tub. In the alternative embodiment that includes two wipers 80, 180, a larger tub 100 is used.

After a period of time, the collected chips within the tub 100 will separate by gravity from the oil and gather at the bottom of the tub 100. The oil can then be ran-off into a second container by merely tipping the tub 100. In one example, an alternative receptacle 110 includes a perforated plate 115 mounted above a bottom surface of the receptacle. As shown in FIG. 1, the alternative receptacle 110 may be mounted at an angle to passively direct oil towards a drainage pipe 120. Periodically, the apparatus may be either partially or completely drained of collected oil in a decanting process without interrupting the operation of the skimmer.

The present invention further includes a method of operation of the skimmer to remove hydrocarbon and metal chip contaminants from a body of water.

Although the invention has been described in its preferred form with a certain degree of particularity, it is understood that the present disclosure of the preferred form has been only by way of example and that numerous changes in the details of the construction, operation and the combination and arrangement of parts may be resorted to without departing from the spirit and scope of the invention as hereinafter claimed.

What is claimed is:

1. A skimmer for removing hydrocarbon and metal chip contaminants from a body of coolant, the skimmer comprising:
   a) a frame structure for positioning above a body of coolant;
   b) an endless tube trained partially within said frame structure and defining a travel path, said path having a first section within said body of coolant and a second section out of said body of coolant;
   c) a magnet disposed within said tube;
   d) a drive system mounted to said frame structure and operatively coupled to said tube for powering said tube into and out of said body of coolant along said travel path;
   e) a wiper connected to said frame structure at a position along said travel path, wherein said wiper is positioned adjacent to said tube such that said wiper will wipe hydrocarbon and metal chip contaminants carried by said tube as said tube is in motion; and
   f) a receptacle delineating a collection space positioned below said wiper to receive wiper removed hydrocarbon and metal chip contaminants.

2. The skimmer of claim 1 further comprising a plurality of magnets disposed within said tube in a spaced relationship.

3. The skimmer of claim 1 further comprising:
   a) a plurality of magnets disposed within said tube; and
   b) a plurality of spacers disposed within said tube, wherein each of said plurality of spacers is disposed between two of said plurality of magnets.

4. The skimmer of claim 3 wherein each of said plurality of spacers is constructed of a material selected from the group consisting of wood, plastic and metal.

5. The skimmer of claim 1 further comprising:
   a) a bracket mounted to said frame structure; and
   b) a shaft seal connected to said bracket and disposed between said wiper and said bracket;
   c) wherein said seal maintains said wiper in an essentially fixed position along a longitudinal axis of said tube.

6. The skimmer of claim 1 wherein said receptacle defines a hole for draining hydrocarbons collected within said receptacle.

7. The skimmer of claim 1 further comprising a series of guides successively mounted to said frame structure to define a travel path of said tube within said frame structure.

8. The skimmer of claim 1 further comprising a housing mounted to said frame structure, said housing comprising said drive system and a series of guides defining a travel path of said tube within said housing.

9. The skimmer of claim 1 further comprising a perforated plate mounted above a bottom surface of said receptacle.

10. The skimmer of claim 1 further comprising a second wiper connected to said frame structure to remove accumulations of metal chips carried by said tube prior to said tube contacting said first wiper.

11. A method of removing hydrocarbon and metal chip contaminants from a body of water, said method comprising the steps of:
    a) positioning a plurality of magnets with an endless tube in spaced apart relationship;
    b) locating said endless tube within a drive system mounted to a frame structure and thereby positioning a portion of said tube in a body of coolant;
    c) operating said drive system to cause said endless tube to travel on a descending path into said body of coolant, thereby causing hydrocarbons and chips to collect on an outer surface of said tube, wherein said chips are magnetically joined to said plurality of magnets on said outer surface of said tube;
    d) continuing to operate said drive system to bring said tube on an ascending path to a wiper, said wiper connected to said frame structure and positioned adjacent to said tube;
    e) wiping hydrocarbons and chips adhering to said outer surface of said tube by passing said tube by said wiper; and
    f) collecting said wiped hydrocarbons and chips that fall by gravity into a receptacle positioned below said wiper.

12. The process of claim 11 further comprising performing the wiping step on a generally horizontal section of the tube.

13. The process of claim 11 further comprising the step of positioning said wiper around the outer surface of the tube and along a section of the tube prior to the descending path of the tube, wherein said wiper is an annular wiper.

14. The process of claim 11 further comprising the step of separating by gravity the hydrocarbons from the chips that collect in said receptacle.

15. An apparatus for removing oil and metal chips contaminants from the surface of a body of coolant, the skimmer comprising:
    a) a frame structure for positioning above a body of contaminated coolant;
    b) a housing mounted to said frame structure;
    c) an endless tube trained within said frame structure and having a descending reach within said body of coolant and an ascending reach out of said body of coolant;
    d) a plurality of magnets disposed within said tube in a spaced relationship;
    e) a drive system mounted to said frame structure and operatively coupled to said tube for powering travel of said tube into and out of said body of coolant along a travel path;
    f) an annular wiper connected to said frame structure and along an ascending travel path relative to said body of coolant, wherein an interior surface of said annular wiper is positioned adjacent to an outer surface of said tube; and
    g) a receptacle delineating a collection space positioned to receive gravity feed oil and metal chip contaminants that are removed by said annular wiper.

16. The apparatus of claim 15 further comprising a plurality of spacers disposed within said tube, wherein each of said plurality of spacers is disposed between two of said plurality of magnets.

17. The apparatus of claim 16 wherein each of said plurality of spacers is constructed of a material selected from the group consisting of wood, plastic and metal.

18. The apparatus of claim 15 further comprising a bracket mounted to said frame structure, a shaft seal connected to said bracket and disposed between said wiper and said bracket, wherein said seal maintains said wiper in an essentially fixed position along a longitudinal axis of said tube.

19. The apparatus of claim 15 wherein said receptacle comprises a drain for removal of hydrocarbon material collected within said receptacle.

20. The apparatus of claim 15 further comprising a series of guides successively mounted to said frame structure to define a travel path of said tube within said frame structure.

21. The apparatus of claim 15 further wherein said housing comprises said drive system and a series of guides defining a travel path of said tube within said housing.

22. The apparatus of claim 15 further comprising a second annular wiper connected to said frame structure along an ascending travel path relative to said body of water to wipe accumulations of metal chips carried by said tube prior to said tube contacting said first annular wiper.

23. The apparatus of claim 22 wherein said second annular wiper comprises a ring having a center axis and a plurality of spokes extending radially from said ring toward said center axis.

24. The apparatus of claim 22 wherein said second annular wiper comprises a flat washer.

25. The apparatus of claim 22 wherein said second annular wiper comprises a ring having a center axis and a plurality of brush bristles extending radially from said ring toward said center axis.

26. The skimmer of claim 15 further comprising a perforated plate mounted above a bottom surface of said receptacle, wherein said perforated plate block chips from falling to said bottom surface of said receptacle.

27. The skimmer of claim 15 wherein said receptacle comprises a decanter for separating hydrocarbons from machine tool coolant, wherein said decanter has a first port for removing hydrocarbons.

* * * * *